United States Patent
Lee et al.

(10) Patent No.: US 8,711,959 B2
(45) Date of Patent: Apr. 29, 2014

(54) FREQUENCY OFFSET ESTIMATION APPARATUS AND METHOD OF OFDM SYSTEM

(75) Inventors: Youngpo Lee, Suwon-si (KR); Seokho Yoon, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 0 days.

(21) Appl. No.: 13/608,133

(22) Filed: Sep. 10, 2012

(65) Prior Publication Data

US 2013/0223576 A1    Aug. 29, 2013

(30) Foreign Application Priority Data

Feb. 29, 2012    (KR) .................. 10-2012-0021007

(51) Int. Cl.
   *H04L 5/12*     (2006.01)
   *H04L 23/02*    (2006.01)

(52) U.S. Cl.
   USPC .......... 375/262; 375/285; 375/341; 375/343; 375/344; 375/345

(58) Field of Classification Search
   USPC ............... 375/219–223, 229–232, 259–285, 375/295–299, 316, 340–341, 346–350
   See application file for complete search history.

(56) References Cited

U.S. PATENT DOCUMENTS

2011/0274219 A1* 11/2011 Song et al. .................. 375/341

OTHER PUBLICATIONS

Chong, Dahae, et al., "Robust estimators for frequency offset of OFDM in non-Gaussian noise," IEICE Electronics Express, published Sep. 10, 2012, pp. 1412-1418, vol. 8, No. 17.
Blankenship, T. Keith, et al., "Characteristics of Impulsive Noise in the 450-MHz Band in Hospitals and Clinics," IEEE Transactions on Antennas and Propagation, Feb. 1998, pp. 194-203, vol. 46, No. 2.
Choi, Ji-Woong, et al., "Joint ML Estimation of Frame Timing and Carrier Frequency Offset for OFDM Systems Employing Time-Domain Repeated Preamble," IEEE Transactions on Wireless Communications, Jan. 2010, pp. 311-317, vol. 9, No. 1.
Hwang, Taewon, et al., "OFDM and Its Wireless Applications: A Survey," IEEE Transactions on Vehicular Technology, May 2009, pp. 1673-1694, vol. 58, No. 4.

(Continued)

*Primary Examiner* — Sam K Ahn
*Assistant Examiner* — James M Perez
(74) *Attorney, Agent, or Firm* — NSIP Law

(57) ABSTRACT

The present invention provides an apparatus and method for estimating a frequency offset which are robust against non-Gaussian noise. In a frequency offset estimation method of an Orthogonal Frequency Division Multiplexing (OFDM) system using a training symbol, the method includes receiving a reception signal, setting a specific initial frequency offset corresponding to the reception signal, and calculating a log-likelihood function based on a Complex Isotropic Symmetric α Stable (CISαS) probability density function obtained by modeling non-Gaussian noise included in the reception signal and estimating an optimum frequency offset based on the log-likelihood function and the initial frequency offset through a Maximum Likelihood Estimator (MLE). Accordingly, in a non-Gaussian noise environment, frequency offset estimated performance can be improved as compared with a conventional method in which noise is assumed to be a normal distribution.

12 Claims, 11 Drawing Sheets

(56) References Cited

OTHER PUBLICATIONS

Ma, Xinyu, et al., "Parameter Estimation and Blind Channel Identification in Impulsive Signal Environments," IEEE Transactions on Signal Processing, Dec. 1995, pp. 2884-2897, vol. 43, No. 12.

Morelli, M., et al., "An Improved Frequency Offset Estimator for OFDM Applications," IEEE Commun. Lett., Mar. 1999, pp. 75-77, vol. 3, No. 3.

Schmidl, Timothy M., et al., "Robust Frequency and Timing Synchronization for OFDM," IEEE Transactions on Communications, Dec. 1997, pp. 1613-1621, vol. 45, No. 12.

Torio, Pablo, et al., "A Study of the Correlation Between Horizontal and Vertical Polarizations of Impulsive Noise in UHF," IEEE Transactions on Vehicular Technology, Sep. 2007, pp. 2844-2849, vol. 56, No. 5.

\* cited by examiner (a) GSNR=5dB (b) GSNR=15dB

FREQUENCY OFFSET ESTIMATION APPARATUS AND METHOD OF OFDM SYSTEM

Priority to Korean patent application number 10-2012-0021007 filed on Feb. 29, 2012, the entire disclosure of which is incorporated by reference herein, is claimed.

BACKGROUND OF THE INVENTION

1. Field of the Invention

The present invention relates to a frequency offset estimation apparatus and method of an Orthogonal Frequency Division Multiplexing (OFDM) system and, more particularly, to an apparatus and method for estimating a frequency offset which are robust against non-Gaussian noise.

This research was supported by the National Research Foundation (NRF) of Korea under Grants 2012-0005066 and 2012R1A2A2A01045887 with funding from the Ministry of Education, Science and Technology (MEST), Korea, and by the Information Technology Research Center (ITRC) program of the National IT Industry Promotion Agency under Grant NIPA-2012-H0301-12-1005 with funding from the Ministry of Knowledge Economy (MKE), Korea.

2. Discussion of the Related Art

An Orthogonal Frequency Division Multiplexing (OFDM) system is advantageous in that it has high frequency use efficiency and a simple equalizer structure and it is robust against multi-path fading, as compared with the existing single carrier communication system. That is, the OFDM system is being widely used as modulation technology for wireless communication systems owing to high frequency band efficiency and a characteristic robust against multi-path fading and thus has been adopted as the standard of lots of communication system, such as a Digital Subscriber Line (DSL), European Digital Audio and Video Broadcasting (DAB/DVB), IEEE 802.11a, and Hiper-LAN II. Multi-user OFDM technology has been adopted as the IEEE 802.16 standard.

The performance of the OFDM system is very sensitive to a frequency offset that is generated owing to oscillator mismatch or a Doppler phenomenon between a transmitter and a receiver. If a frequency offset exists, orthogonality between sub-carriers is broken and thus interference is generated, with the result that the performance of the OFDM system is severely deteriorated. Accordingly, the estimation of a frequency offset in the OFDM system is one of the most important technical problems that must be solved. Training symbol-based frequency offset estimation which provides better performance than blind-based frequency offset estimation had been taken into consideration.

Conventional frequency offset estimation methods were chiefly proposed assuming that ambient noise is a Gaussian process (Non-patent document 2 to 4). The ambient noise, however, was frequently observed to have a non-Gaussian characteristic in a wireless channel. This is chiefly generated owing to impulse environments resulting from various causes, such as a vehicle ignition device, a moving obstacle, lightning in the air, and reflection of water waves (Non-patent document 5 to 6). The conventional frequency offset estimation methods are problematic in that they have very low performance under the non-Gaussian noise environment because they have been developed on the assumption that embient noise is a Gaussian process.

PRIOR ART DOCUMENT

Non-Patent Documents (Non-patent document 1) T. Hwang, C. Yang, G Wu, S. Li, and G Y. Li, "OFDM and its wireless applications: a survey," IEEE Trans. Veh. Technol., vol. 58, no. 4, pp. 1673-1694, May 2009.

(Non-patent document 2) T. M. Schmidl and D. C. Cox, "Robust frequency and timing synchronization for OFDM," IEEE Trans. Commun., vol. 45, no. 12, pp. 1613-1621, December 1997.

(Non-patent document 3) M. Morelli and U. Mengali, "An improved frequency offset estimator for OFDM applications," IEEE Commun Lett., vol. 3, no. 3, pp. 75-77, March 1999.

(Non-patent document 4) J.-W. Choi, J. Lee, Q. Zhao, and H.-L. Lou, "Joint ML estimation of frame timing and carrier frequency offset for OFDM systems employing time-domain repeated preamble," IEEE Trans. Wireless Commun., vol. 9, no. 1, pp. 311-317, January 2010.

(Non-patent document 5) T. K. Blankenship and T. S. Rappaport, "Characteristics of impulsive noise in the 450-MHz band in hospitals and clinics," IEEE Trans. Antennas Propag., vol. 46, no. 2, pp. 194-203, February 1998.

(Non-patent document 6) P. Torio and M. G. Sanchez, "A study of the correlation between horizontal and vertical polarizations of impulsive noise in UHF," IEEE Trans. Veh. Technol., vol. 56, no. 5, pp. 2844-2849, September 2007.

(Non-patent document 7) X. Ma and C. L. Nikias, "Parameter estimation and blind channel identification in impulsive signal environments," IEEE Trans. Signal Process., vol. 43, no. 12, pp. 2884-2897, December 1995.

SUMMARY OF THE INVENTION

An object of the present invention is to provide a method of estimating an offset of an OFDM system which is robust against non-Gaussian noise by calculating a probability density function by modeling the non-Gaussian noise into complex isotropic Cauchy noise and estimating an optimum offset by using a Maximum Likelihood Estimator (MLE) on the basis of the probability density function.

Another object of the present invention is to provide a method of simply estimating an offset of an OFDM system by using a probability density function obtained by modeling non-Gaussian noise into complex isotropic Cauchy noise and a maximum likelihood method when frequency offsets are uniformly distributed within a specific range.

Technical objects of the present invention are not limited to the above-described objects, and other technical objects that have not been described will be evident to those skilled in the art from the following description.

In accordance with an embodiment of the present invention, there is provided a frequency offset estimation method of an Orthogonal Frequency Division Multiplexing (OFDM) system using a training symbol, including receiving a reception signal, setting a specific initial frequency offset corresponding to the reception signal, and calculating a log-likelihood function based on a Complex Isotropic Symmetric $\alpha$ Stable (CIS$\alpha$S) probability density function obtained by modeling non-Gaussian noise included in the reception signal and estimating an optimum frequency offset based on the log-likelihood function and the initial frequency offset through a Maximum Likelihood Estimator (MLE). Here, the reception signal may have a repetitive structure and include the training symbol with which the non-Gaussian noise is summed Furthermore, estimating the optimum frequency offset may be repeated by a preset number of times. Here, the log-likelihood function may be represented by Equation below.

$$\Lambda(\tilde{\varepsilon}) = \sum_{k=0}^{N/2-1} \log\{|r(k+N/2) - r(k)e^{j\pi\tilde{\varepsilon}}|^2 + 4\gamma^2\}$$

wherein N indicates the number of samples of the reception signal, r(k) indicates a $k^{th}$ sample of the reception signal, $\gamma$ indicates the degree of spreading of noise, and $\tilde{\varepsilon}$ indicates a candidate value of the frequency offset. Furthermore, estimating the optimum frequency offset may include estimating $\hat{\varepsilon}$, satisfying Equation below $$\left. \frac{d\Lambda(\tilde{\varepsilon})}{d\tilde{\varepsilon}} \right|_{\tilde{\varepsilon}=\hat{\varepsilon}} = 0$$

wherein $\tilde{\varepsilon}$ indicates a candidate value of the frequency offset, and $\hat{\varepsilon}$ indicates the optimum frequency offset. Furthermore, a non-Gaussian noise component included in the reception signal may comply with a complex isotropic Cauchy distribution having a dispersion of $2\gamma$. Here, estimating the optimum frequency offset may include estimating the optimum frequency offset based on Equation below.

$$\hat{\varepsilon} = \frac{1}{\pi} \angle \left( \sum_{k=0}^{N/2-1} \frac{r^*(k)r(k+N/2)}{4\gamma^2 + |r(k)|^2 + |r(k+N/2)|^2 - 2|r(k)r(k+N/2)|\cos(\pi\hat{\varepsilon}+\theta_k)} \right)$$

wherein N indicates the number of samples of the reception signal, r(k) indicates a $k^{th}$ sample of the reception signal, * indicates a conjugate complex operation, $\gamma$ indicates the degree of spreading of noise, $\hat{\varepsilon}$ on the right side indicates the initial frequency offset or an optimum frequency offset in a previous step, $\angle$ indicates an angular operation, $\theta_k$ indicates $\angle(r(k)r^*(k+N/2))$, and $\hat{\varepsilon}$ on the left side indicates an optimum frequency offset.

In accordance with another embodiment of the present invention, there is provided a frequency offset estimation method of an Orthogonal Frequency Division Multiplexing (OFDM) system using a training symbol, including receiving a reception signal and estimating a frequency offset based on a probability density function obtained by modeling non-Gaussian noise included in the reception signal, wherein estimating the frequency offset includes estimating the frequency offset based on a mean value of factors of an angular operation on an optimum offset when the frequency offsets are uniformly distributed in a specific range. Here, the probability density function may be a Complex Isotropic Symmetric $\alpha$ Stable (CIS$\alpha$S) probability density function. Here, the specific range may be in the range of $(-1,1]$ when normalization is performed at sub-carrier intervals. Furthermore, estimating the frequency offset may include estimating the frequency offset based on Equation below.

$$\hat{\varepsilon}_s =$$

$$\frac{1}{\pi} \angle \left( \sum_{k=0}^{\frac{N}{2}-1} \frac{r^*(k)r(k+N/2)}{\sqrt{\{4\gamma^2 + (|r(k)| + |r(k+N/2)|)^2\}\{4\gamma^2 + (|r(k)| - |r(k+N/2)|)^2\}}} \right)$$

wherein N indicates the number of samples of the reception signal, r(k) indicates a $k^{th}$ sample of the reception signal, * indicates a conjugate complex operation, $\gamma$ indicates the degree of spreading of noise, $\angle$ indicates the angular operation, and $\hat{\varepsilon}_s$ indicates an estimated frequency offset.

In accordance with yet another embodiment of the present invention, there is provided a frequency offset estimation apparatus of an Orthogonal Frequency Division Multiplexing (OFDM) system using a training symbol, including an input unit for receiving a reception signal and an estimation unit for estimating a frequency offset based on a probability density function obtained by modeling non-Gaussian noise included in the reception signal, wherein the estimation unit may estimate the frequency offset based on the mean value of factors of an angular operation on an optimum offset when the frequency offsets are uniformly distributed in a specific range. Furthermore, the probability density function may be a Complex Isotropic Symmetric $\alpha$ Stable (CIS$\alpha$S) probability density function. Furthermore, the specific range may be in the range of $(-1,1]$ when normalization is performed at sub-carrier intervals. Here, the estimation unit may estimate the frequency offset based on Equation below.

$$\hat{\varepsilon}_s =$$

$$\frac{1}{\pi} \angle \left( \sum_{k=0}^{\frac{N}{2}-1} \frac{r^*(k)r(k+N/2)}{\sqrt{\{4\gamma^2 + (|r(k)| + |r(k+N/2)|)^2\}\{4\gamma^2 + (|r(k)| - |r(k+N/2)|)^2\}}} \right)$$

wherein N indicates the number of samples of the reception signal, r(k) indicates a $k^{th}$ sample of the reception signal, * indicates a conjugate complex operation, $\gamma$ indicates the degree of spreading of noise, $\angle$ indicates the angular operation, and $\hat{\varepsilon}_s$ indicates an estimated frequency offset.

BRIEF DESCRIPTION OF THE DRAWINGS

The accompany drawings, which are included to provide a further understanding of this document and are incorporated on and constitute a part of this specification illustrate embodiments of this document and together with the description serve to explain the principles of this document.

DETAILED DESCRIPTION OF THE EMBODIMENTS

Figure 1:
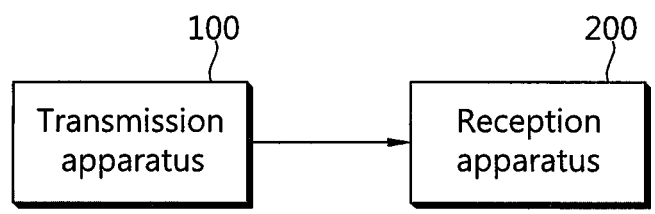
FIG. 1 shows a schematic construction of an OFDM system according to an embodiment of the present invention.

The present invention may be modified in various ways, and the present invention may have several embodiments. Specific embodiments of the present invention are illustrated in the drawings and described in detail.

However, the present invention is not limited to the specific embodiments, but should be interpreted as including all changes, equivalents, and substitutions included in the spirit and technical range of the present invention.

In describing the embodiments of this specification, a detailed description of the known functions and constructions will be omitted if it is deemed to make the gist of the present invention unnecessarily vague.

Terms, such as the first and the second, may be used to describe various elements, but the elements should not be restricted by the terms. The terms are used to only distinguish one element and the other element from each other. For example, a first element may be named a second element without departing from the scope of the present invention. Likewise, a second element may also be named a first element. The term 'and/or' includes a combination of a plurality of related and described items or any one of a plurality of related and described items.

If one element is described to be "connected" or "coupled" to the other element, the one element may be directly connected or coupled to the other element, but it should be understood that a third element may exist between the two elements. On the other hand, if one element is described to be "directly connected" or "directly coupled" to the other element, it should be understood that a third element does not exist between the two elements.

The terms used in this application are used to only describe the specific embodiments and are not intended to restrict the present invention. An expression of the singular number includes an expression of the plural number unless clearly defined otherwise in the context. In this application, terms, such as "comprise" or 'have", are intended to designate that characteristics, numbers, steps, operations, elements, or parts which are described in the specification, or a combination of them exist, and should be understood that they exclude the existence or possible addition of one or more other characteristics, numbers, steps, operations, elements, parts, or combinations of them in advance.

Furthermore, elements described in the embodiments of the present invention are independently shown in order to indicate different and characteristic functions, and it does not mean that each of the elements consists of separate hardware or a piece of software unit. That is, the elements are arranged, for convenience of description, and at least two of the elements may be combined to form one element or one element may be divided into a plurality of elements and the plurality of elements may perform functions. An embodiment in which the elements are combined or each of the elements is divided is included in the scope of the present invention without departing from the essence of the present invention.

All the terms used herein, unless otherwise defined, have the same meanings which are typically understood by those having ordinary skill in the art. The terms, such as ones defined in common dictionaries, should be interpreted to have the same meanings as terms in the context of pertinent technology, and should not be interpreted to have ideal or excessively formal meanings unless clearly defined in the specification.

Hereinafter, preferred embodiments of the present invention will be described in detail with reference to the accompanying drawings. In describing the present invention, in order to help overall understanding, the same reference numerals designate the same elements throughout the drawings, and a redundant description of the same elements is omitted.

FIG. 1 shows a schematic construction of an OFDM system according to an embodiment of the present invention.

As shown in FIG. 1, the OFDM system may include a transmission apparatus 100 and a reception apparatus 200. The reception apparatus 200 may include a frequency offset estimation apparatus for estimating a frequency offset occurring owing to oscillator mismatch between the reception apparatus 200 and the transmission apparatus 100.

The transmission apparatus 100 modulates data to be transmitted by using a Phase Shift Keying (PSK) or Quadrature Amplitude Modulation (QAM) method and generates an OFDM signal by performing Inverse Fast Fourier Transform (IFFT) on the modulated data.

Frequency Offset Estimation Method

Figure 2:
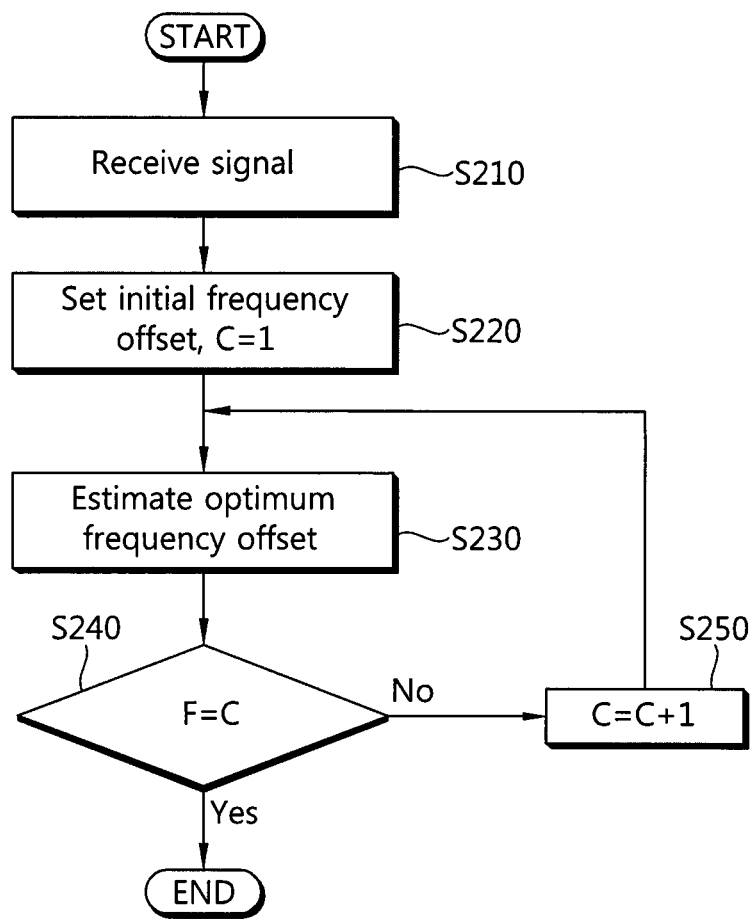
FIG. 2 is a flowchart illustrating a frequency offset estimation method of the OFDM system according to an embodiment of the present invention.

FIG. 2 is a flowchart illustrating a frequency offset estimation method of the OFDM system according to an embodiment of the present invention.

As shown in FIG. 2, in the frequency offset estimation method of the OFDM system according to the embodiment of the present invention, the frequency offset estimation apparatus that may be included in the reception apparatus 200 receives a reception signal from the transmission apparatus 100 at step S210.

A $k^{th}$ OFDM sample r(k) received by the reception apparatus 200 from the transmission apparatus 100 is represented by Equation 1 below (k=0, 1, . . . , N−1).

$$r(k) = \sum_{l=0}^{L-1} h(l)x(k-l)e^{j2\pi k\epsilon/N} + n(k) \quad \text{[Equation 1]}$$

In Equation 1, h(l) indicates the $i^{th}$ channel coefficient of a multi-path channel having a length of L, x(k) indicates a $k^{th}$ sample of the OFDM symbol which has a size of N and which has been generated by IFFT, $\epsilon$ indicates a frequency offset normalized at a sub-carrier interval 1/N, and n(k) indicates a $k^{th}$ sample of additive noise.

When the reception signal is received, the frequency offset estimation apparatus sets a specific initial frequency offset corresponding to the reception signal at step S220. After the specific initial frequency offset is set, an optimum frequency offset may be estimated by using the initial frequency offset.

More particularly, non-Gaussian noise included in the reception signal may be modeled into a Complex Isotropic Symmetric α Stable (CISαS) probability density function, a log-likelihood function may be calculated on the basis of the probability density function, and an optimum frequency offset may be estimated through a Maximum Likelihood Estimator (MLE) on the basis of the log-likelihood function and the initial frequency offset at step S230.

The step S230 of estimating the optimum frequency offset is described in detail below. In the present invention, a CISαS model that may be used as a non-Gaussian noise model may be used. The probability density function pdf of the additive noise n(k) is represented by Equation 2 below.

$$f_n(\rho) = \quad \text{[Equation 2]}$$

$$\frac{1}{4\pi^2}\int_{-\infty}^{\infty}\int_{-\infty}^{\infty}\exp\left[-\gamma(u^2+v^2)^{\frac{\alpha}{2}} - jR\{\rho(u-jv)\}\right]du\,dv$$

In Equation 2, R{•} indicates a real number part, spreading γ (wherein γ>0) indicates the degree of spreading of the probability density function pdf, and a characteristic exponent α (wherein α∈(0,2]) is a parameter related to the thickness of the tail part of the probability density function pdf. As the characteristic exponent a approaches 0, the frequency of occurring impulse noise is high. As the characteristic exponent α approaches 2, impulse noise has a property of Gaussian distribution.

The closed form expression of Equation 2 includes the case where α=1 (i.e., complex isotropic Cauchy) and the case where α=2 (i.e., complex isotropic Gaussian). The probability density function pdf when α=1 or α=2 is represented by Equation 3 below.

$$f_n(\rho) = \begin{cases} \frac{\gamma}{2\pi}(|\rho|^2+\gamma^2)^{-\frac{3}{2}}, & \text{when } \alpha = 1 \\ \frac{1}{4\pi\gamma}\exp\left(-\frac{|\rho|^2}{4\gamma}\right), & \text{when } \alpha = 2 \end{cases} \quad \text{[Equation 3]}$$

In the present invention, the case where α=1 may be used. A frequency offset estimation method when α=1 is robust against a change of the characteristic exponent α, and it has better performance than the existing estimation method for most of the characteristic exponents α.

The reception signal received by the reception apparatus 200 has a repetitive structure and may have a training symbol with which non-Gaussian noise is summed More particularly, in order to estimate a frequency offset, a training symbol $\{(x)\}_{k=0}^{N-1}$ having a repetitive structure is taken into consideration. That is, x(k)=x(k+N/2), and $$k = 0, 1, \ldots, \frac{N}{2}-1.$$

If the characteristics of the training symbol, Equation 4 below may be induced from Equation 1 when $$k = 0, 1, \ldots, \frac{N}{2}-1.$$

$$r(+N/2)-r(k)e^{j\pi\epsilon}=n(k+N/2-n(k)e^{j\pi\epsilon} \quad \text{[Equation 4]}$$

In Equation 4, since $-n(k)e^{j\pi\epsilon}$ and n(k) have the same distribution, a non-Gaussian noise component n(k+N/2)−n(k)$e^{j\pi\epsilon}$ included in the reception signal may comply with a complex isotropic Cauchy distribution having a dispersion of 2γ. Accordingly, a conditional pdf of r={r(k+N/2)−r(k)$e^{j\pi\epsilon}\}_{k=0}^{N/2-1}$ for ϵ, such as that shown in Equation 5 below, may be obtained.

$$f_r(r|\epsilon) = \prod_{k=0}^{\frac{N}{2}-1}\frac{\gamma}{\pi(|r(k+N/2)-r(k)e^{j\pi\epsilon}|^2+4\gamma^2)^{\frac{3}{2}}} \quad \text{[Equation 5]}$$

An estimation value $\hat{\epsilon}$ is calculated as in Equation 6 below according to an MLE by using the conditional pdf of Equation 5.

$$\hat{\epsilon} = \underset{\tilde{\epsilon}}{\operatorname{argmax}}[\log f_r(r|\tilde{\epsilon})] \quad \text{[Equation 6]}$$

$$= \underset{\tilde{\epsilon}}{\operatorname{argmin}}\Lambda(\tilde{\epsilon}),$$

$\tilde{\epsilon}$ indicates a candidate value of ϵ, and a log-likelihood function is a cyclic function having a cycle of 2 for ϵ.

$$\Lambda(\tilde{\epsilon}) = \sum_{k=0}^{N/2-1}\log\{|r(k+N/2)-r(k)e^{j\pi\tilde{\epsilon}}|^2+4\gamma^2\} \quad \text{[Equation 7]}$$

The log-likelihood function may have the same characteristic as that shown in Equation 7, but in Equation 7, N indicates the number of samples of the reception signal, r(k) indicates a $k^{th}$ sample of the reception signal, γ indicates the degree of spreading of noise, and $\tilde{\epsilon}$ indicates a candidate value of the frequency offset. Accordingly, a minimum value of $\Lambda(\tilde{\epsilon})$ is generated when the distance is 2, and this may make it difficult to estimate a frequency offset. Assuming that ϵ is uniformly distributed around 0, an effective estimation range of an MLE may be set to −1<ϵ<1 when ϵ is normalized at sub-carrier intervals.

If noise does not exist, $$|r(k+N/2)-r(k)e^{j\pi\tilde{\epsilon}}|^2 = 4\left|\sum_{l=0}^{L-1}h(l)x(k-l)\right|^2\sin^2(\pi(\tilde{\epsilon}-\epsilon)/2).$$

From the fact that the log function is a monotone increasing function, it can be seen that $\Lambda(\tilde{\epsilon})$ is a block function having an interval of ϵ2z−1<$\tilde{\epsilon}$≤ϵ2z+1 when noise does not exist (z is an integer). Therefore, the maximum likelihood estimation value $\hat{\epsilon}$ in Equation 6 may be calculated by calculating $\tilde{\epsilon}$ that satisfies Equation 8 below.

$$\left.\frac{d\Lambda(\tilde{\epsilon})}{d\tilde{\epsilon}}\right|_{\tilde{\epsilon}=\hat{\epsilon}} = 0 \quad \text{[Equation 8]}$$

wherein $\tilde{\epsilon}$ indicates a candidate value of the frequency offset, and $\hat{\epsilon}$ indicates an optimum frequency offset. That is, in the step S230 of estimating the optimum frequency offset, $\hat{\epsilon}$ satisfying Equation 8 may be estimated as the optimum frequency offset.

Equation 9 below may be induced through an algebra process on the basis of the conditions of Equations 6 and 8.

$$\hat{\epsilon} = \frac{1}{\pi} \angle \left( \sum_{k=0}^{N/2-1} \frac{r^*(k)r(k+N/2)}{4\gamma^2 + |r(k)|^2 + |r(k+N/2)|^2 - 2|r(k)r(k+N/2)|\cos(\pi\hat{\epsilon} + \theta_k)} \right)$$ [Equation 9]

wherein N indicates the number of samples of the reception signal, r(k) indicates a k$^{th}$ sample of the reception signal, * indicates a conjugate complex operation, γ indicates the degree of spreading of noise, $\hat{\epsilon}$ on the right side of the equation indicates the initial frequency offset or an optimum frequency offset in a previous step, ∠ indicates an angular operation, $\theta_k$ indicates ∠(r(k)r*(k+N/2)), and $\hat{\epsilon}$ on the left side of the equation indicates an optimum frequency offset.

In the step S230 of estimating the optimum frequency offset, the optimum frequency offset may be estimated on the basis of Equation 9. The estimation method using Equation 9 is called a Cauchy MLE (CME), and the maximum likelihood estimation value $\hat{\epsilon}$ may be obtained through a repetitive process.

FIG. 2 is described in detail below. The frequency offset estimation apparatus receives a reception signal at step S210 and sets a specific initial frequency offset in the range of (−1,1]. The parameter C indicating the number of times executed so far is set to 1 at step S220. Next, an optimum frequency offset is estimated on the basis of the initial frequency offset and Equation 9. Whether the parameter C indicating the number of times executed so far is equal to a preset number of times F is checked at step S240. If, as a result of the check, F is different from C, the parameter C is increased by 1 at step S250, and the estimation of an optimum frequency offset is repeated at step S230. If, as a result of the check, F is equal to C, the estimation of a frequency offset is finished, and a finally obtained frequency offset becomes an optimum frequency offset.

Figure 3:
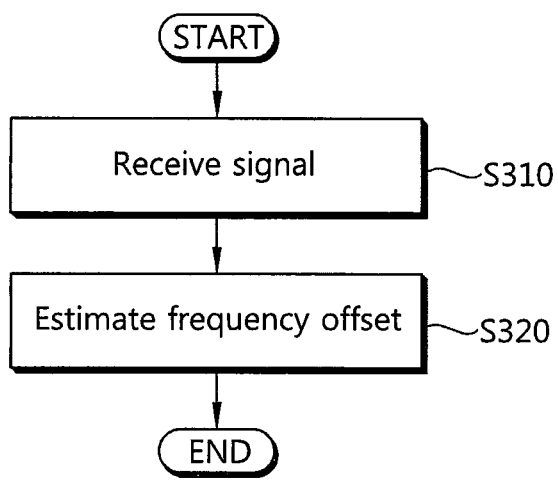
FIG. 3 is a flowchart illustrating a frequency offset estimation method of the OFDM system according to another embodiment of the present invention.

FIG. 3 is a flowchart illustrating a frequency offset estimation method of the OFDM system according to another embodiment of the present invention.

As shown in FIG. 3, the frequency offset estimation method according to another embodiment of the present invention may include receiving a reception signal at step S310 and estimating a frequency offset on the basis of a probability density function by modeling non-Gaussian noise, included in the reception signal, into a CISαS probability density function at step S320. The step S320 of estimating a frequency offset may include estimating a frequency offset on the basis of the mean value of factors of an angular operation on the frequency offset when frequency offsets are uniformly distributed in a specific range.

As a Signal-to-Noise Ratio (SNR) decreases, Cauchy MLE (CME) requires a greater number of repetition times for reliable estimation. Since a distribution the $\hat{\epsilon}$ has not been known, if the mean value of factors of the angular operation ∠ on $\hat{\epsilon}$ calculated in order to avoid repetitive execution assuming that the distribution of $\hat{\epsilon}$ is uniform in a specific range, a simple estimation method may be obtained as in Equation 10 below. Here, the specific range may be in the range of (−1,1].

$$\hat{\epsilon}_s = \frac{1}{\pi} \angle \left( \sum_{k=0}^{\frac{N}{2}-1} \frac{1}{2} \int_{-1}^{1} \frac{r^*(k)r(k+N/2)}{A + B\cos(\pi\hat{\epsilon} + \theta_k)} d\hat{\epsilon} \right)$$ [Equation 10]

$$= \frac{1}{\pi} \angle \left( \sum_{k=0}^{\frac{N}{2}-1} \frac{r^*(k)r(k+N/2)}{\sqrt{\{4\gamma^2 + (|r(k)| + |r(k+N/2)|)^2\}\{4\gamma^2 + (|r(k)| - |r(k+N/2)|)^2\}}} \right)$$

wherein N indicates the number of samples of the reception signal, r(k) indicates a k$^{th}$ sample of the reception signal, * indicates a conjugate complex operation, γ indicates the degree of spreading of noise, ∠ indicates the angular operation, and $\hat{\epsilon}_s$ indicates an estimated frequency offset.

Equation 10 may be obtained by using the equation $$\int_{-\pi}^{\pi} \frac{1}{a + b\cos x} dx = \frac{2\pi}{\sqrt{a^2 - b^2}},$$

assuming that $4\gamma^2+|r(k)|^2+|r(k+N/2)|^2$ and $4\gamma^2+|r(k)|^2+|r(k+N/2)|^2$ are A and B, respectively, in Equation 9.

The step S320 of estimating a frequency offset may include estimating the frequency offset on the basis of Equation 10.

The estimation method using Equation 10 is called a simplified Cauchy MLE (SCME).

Experimental Examples

FIGS. 4A to 4D are graphs showing the results of the Mean Square Error (MSE) of frequency offset estimation values according to a change of a GSNR when a characteristic exponent α is 0.5, 1, 1.5, and 2.

As an experimental example, as shown in FIG. 4, the performances of the MSEs of the estimation methods CME and SCME according to the embodiments of the present invention may be compared with that of the existing estimation method (Non-patent documents 2 to 4).

The following parameters are assumed. An IFFT length N=64, an frequency offset ϵ=0.25, 0 is inputted as an initial frequency offset and the frequency offset is repeated 20 times (F=20) in case of the CME, and the means power of a multipath Rayleigh fading channel for each path having the length L=8 is $$E[|h(l)|^2] = \exp(-l/L) / \left\{ \sum_{l=0}^{L-1} \exp(-l/L) \right\}$$

wherein l=0, 1, . . . , 7. E[•] indicates a statistical expectation value. It is meaningless to apply a standard SNR to CISαS noise wherein α<2 because variance has not been defined in the noise.

Accordingly, in the present invention, a geometric SNR (GSNR) $E[|x(k)|^2]/(4C^{-1+2/\alpha}\gamma^{2/\alpha})$ may be introduced. Here, $$C = \exp\left\{ \lim_{m \to \infty} \left( \sum_{i=1}^{m} \frac{1}{i} - \ln m \right) \right\} \simeq 1.78)$$

the exponent of Euler's constant is introduced. The GSNR indicates a relative intensity between a signal including information and CISαS wherein α<2. When α=2, the GSNR is identical with the SNR. γ is assumed to have a known value ($\gamma=1$) because it may be easily and accurately estimated using the mean of received samples and the variance (Non-patent document 7).

Figure 4A:
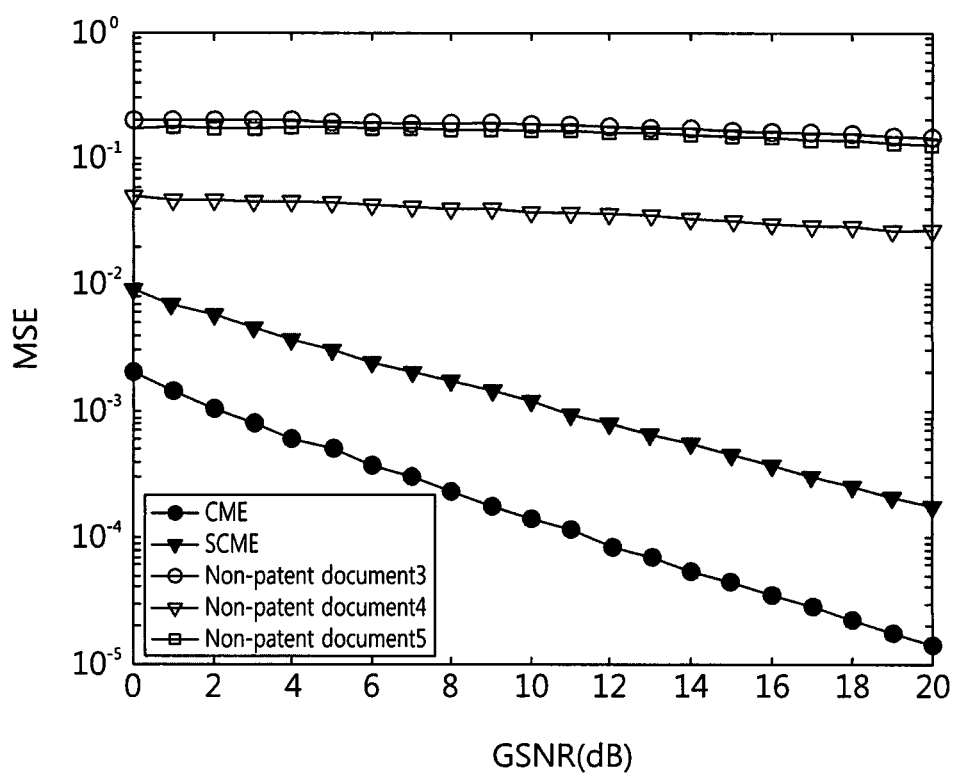
FIGS. 4A to 4D are graphs showing the results of the Mean Square Error (MSE) of frequency offset estimation values according to a change of a GSNR when a characteristic exponent $\alpha$ is 0.5, 1, 1.5, and 2.
Figure 4B:
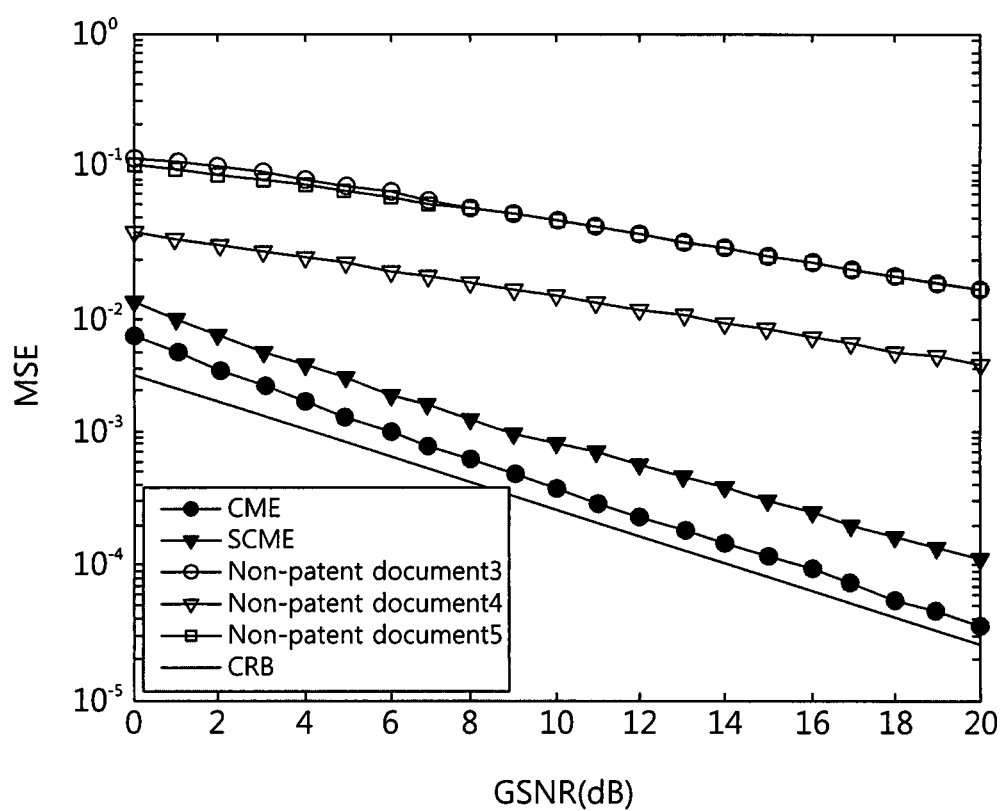
Figure 4C:
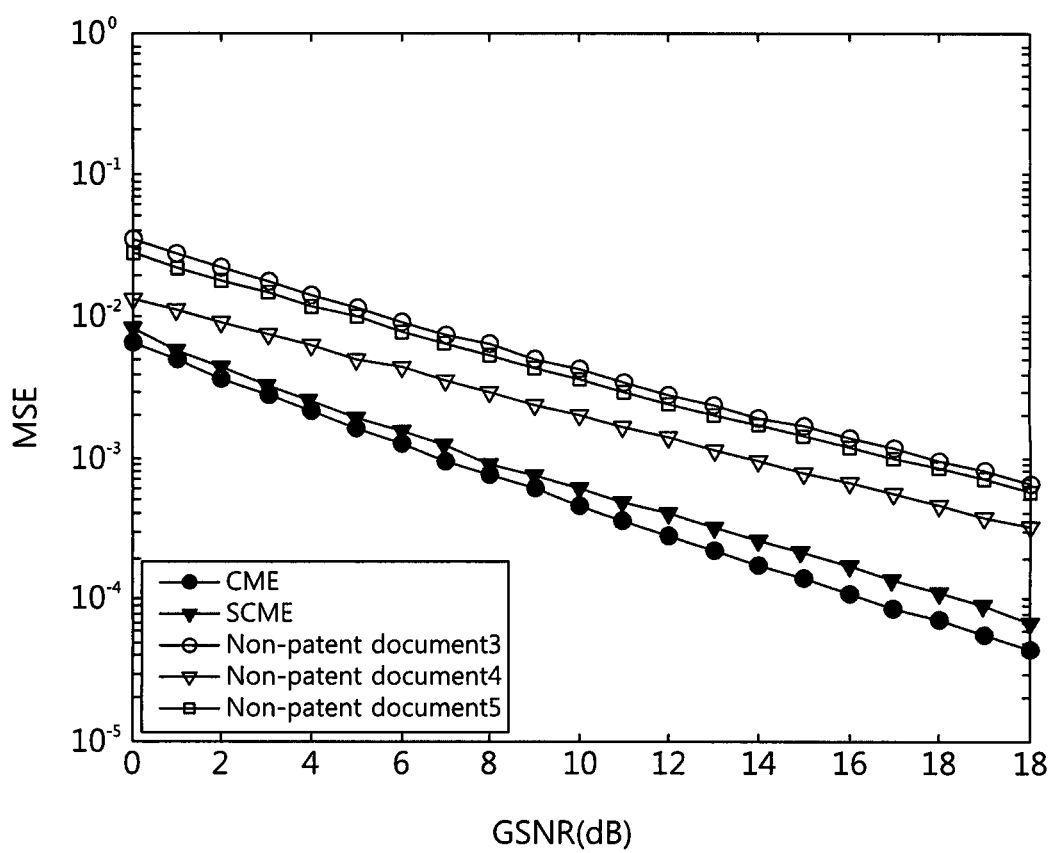
Figure 4D:
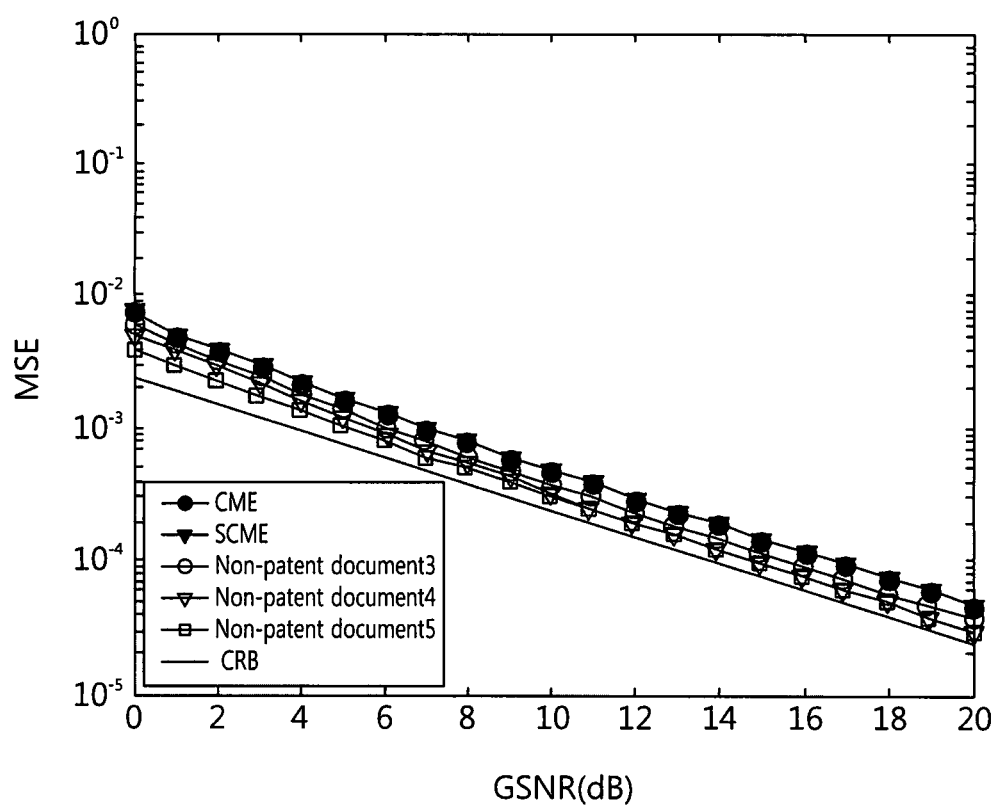

FIGS. 4A to 4D shows the MSE performances of the methods according to the embodiments of the present invention and the existing methods for a change the GSNR, when the characteristic exponent $\alpha$ is 0.5 in FIG. 4A, $\alpha$ is 1 in FIG. 4B, $\alpha$ is 1.5 in FIG. 4C, and $\alpha$ is 2 in FIG. 4D.

Figure 5A:
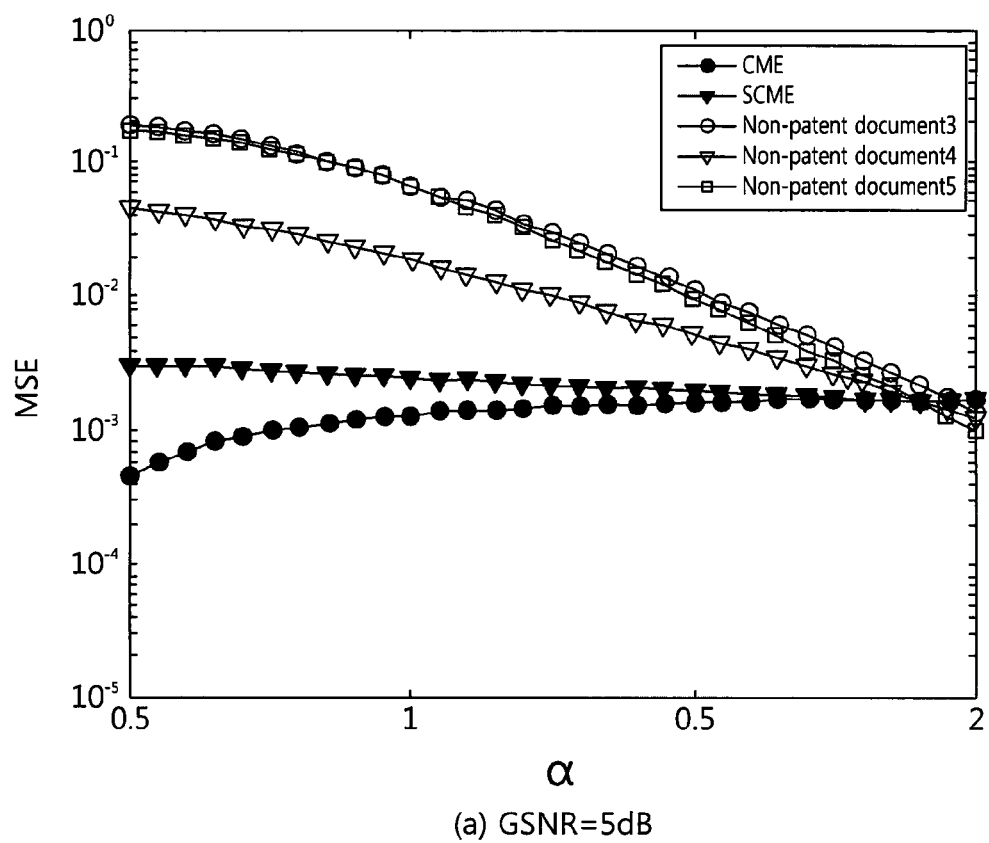
FIGS. 5A and 5B are graphs showing the results of the Mean Square Error (MSE) of frequency offset estimation values according to a change of a characteristic exponent a when a GSNR is 5 dB and 15 dB.
Figure 5B:
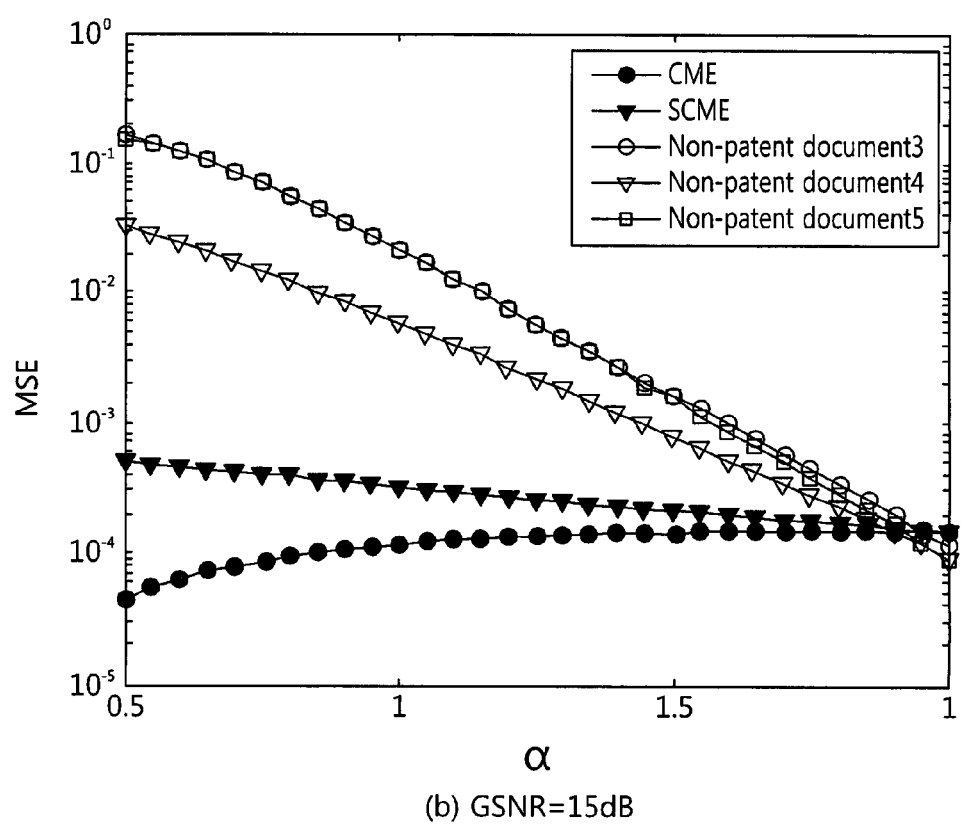

FIGS. 5A and 5B are graphs showing the results of the MSEs of frequency offset estimation values according to a change of the characteristic exponent a when the respective GSNRs are 5 dB and 15 dB. In order to refer to the degree of estimated performance, Cramer-Rao Bounds (CRBs)

$$\frac{15N^2}{32\pi^4 C(N^2-1)(GSNR)} \quad (\alpha=1)$$

was shown on the basis of FIG. 4B, and $$\frac{3N}{2\pi^2(N^2-1)(GSNR)} \quad (\alpha=2)$$

was shown on the basis of FIG. 4D.

From FIGS. 4A to 4D and FIGS. 5A and 5B, it can be seen that the methods according to the embodiments of the present invention have more robust estimated performance than the existing methods in various noise environment.

Apparatus for Estimating a Frequency Offset

Figure 6:
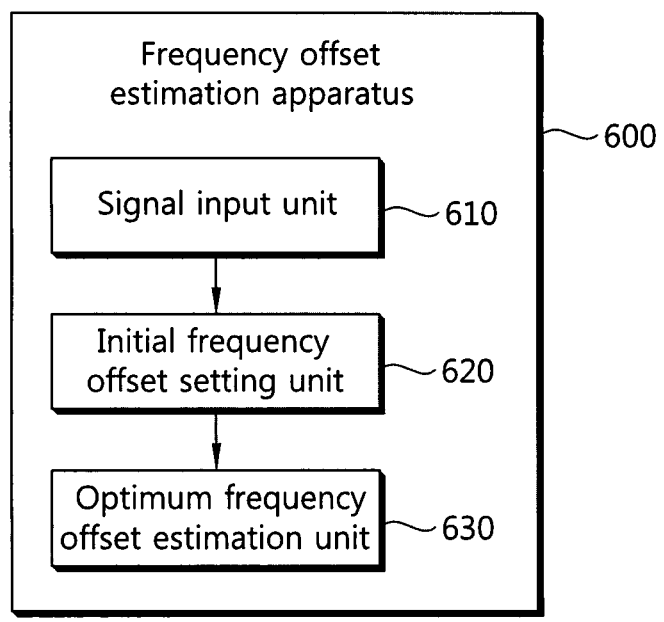
FIG. 6 is a block diagram showing a construction of a frequency offset estimation apparatus of the OFDM system according to an embodiment of the present invention.

FIG. 6 is a block diagram showing a construction of the frequency offset estimation apparatus of the OFDM system according to an embodiment of the present invention.

As shown in FIG. 6, the frequency offset estimation apparatus 600 of the OFDM system according to the embodiment of the present invention may include a signal input unit 610, an initial frequency offset setting unit 620, and an optimum frequency offset estimation unit 630 in an apparatus for estimating a frequency offset of the OFDM system using a training symbol.

The signal input unit 610 receives a reception signal from the transmission apparatus. Here, the reception signal has a repetitive structure and may include a training symbol with which non-Gaussian noise is summed. The initial frequency offset setting unit 620 sets a specific initial frequency offset corresponding to the reception signal. Furthermore, the optimum frequency offset estimation unit 630 may model the non-Gaussian noise, included in the reception signal, into a CISαS probability density function, calculate a log-likelihood function on the basis of the probability density function, and estimate an optimum frequency offset through an MLE on the basis of the log-likelihood function and the initial frequency offset. The optimum frequency offset estimation unit 630 may estimate the optimum frequency offset by repeating the MLE by a preset number of times.

Furthermore, the log-likelihood function may be represented by Equation below.

$$\Lambda(\tilde{\varepsilon}) = \sum_{k=0}^{N/2-1} \log\{|r(k+N/2) - r(k)e^{j\pi\tilde{\varepsilon}}|^2 + 4\gamma^2\}$$

wherein N indicates the number of samples of the reception signal, r(k) indicates a $k^{th}$ sample of the reception signal, $\gamma$ indicates the degree of spreading of noise, and indicates $\tilde{\epsilon}$ a candidate value of a frequency offset.

The estimation unit 630 may estimate $\hat{\epsilon}$, satisfying Equation below $$\left.\frac{d\Lambda(\tilde{\varepsilon})}{d\tilde{\varepsilon}}\right|_{\tilde{\varepsilon}=\hat{\varepsilon}} = 0$$

wherein $\tilde{\epsilon}$ indicates a candidate value of the frequency offset, and $\hat{\epsilon}$ indicates an optimum frequency offset, as an optimum frequency offset.

A non-Gaussian noise component included in the reception signal may comply with a complex isotropic Cauchy distribution having a dispersion of $2\gamma$.

The estimation unit 630 may estimate an optimum frequency offset on the basis of Equation below.

$$\hat{\varepsilon} = \frac{1}{\pi}\angle\left(\sum_{k=0}^{N/2-1} \frac{r^*(k)r(k+N/2)}{4\gamma^2 + |r(k)|^2 + |r(k+N/2)|^2 - 2|r(k)r(k+N/2)|\cos(\pi\tilde{\varepsilon}+\theta_k)}\right)$$

wherein N indicates the number of samples of the reception signal, r(k) indicates the $k^{th}$ sample of the reception signal, * indicates a conjugate complex operation, $\gamma$ indicates the degree of spreading of noise, $\tilde{\epsilon}$ on the right side of the equation indicates the initial frequency offset or an optimum frequency offset in a previous step, $\angle$ indicates an angular operation, $\theta_k$ indicates $\angle(r(k)r^*(k+N/2))$, and $\hat{\epsilon}$ on the left side of the equation indicates an optimum frequency offset.

A detailed operation of the frequency offset estimation apparatus 600 according to an embodiment of the present invention is the same as the above-described frequency offset estimation method.

Figure 7:
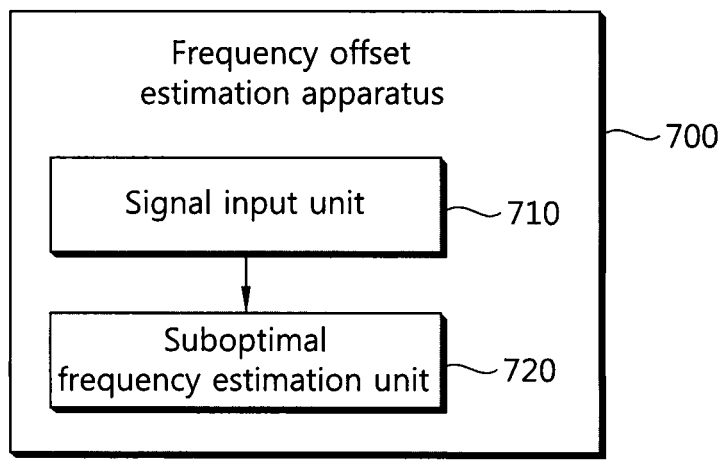
FIG. 7 is a block diagram showing a construction of a frequency offset estimation apparatus of the OFDM system according to another embodiment of the present invention.

FIG. 7 is a block diagram showing a construction of the frequency offset estimation apparatus of the OFDM system according to another embodiment of the present invention.

As shown in FIG. 7, the frequency offset estimation apparatus 700 according to another embodiment of the present invention may include a signal input unit 710 and a suboptimal frequency offset estimation unit 720 in an apparatus for estimating a frequency offset of the OFDM system using a training symbol.

The signal input unit 710 receives a reception signal from the transmission apparatus. Here, the reception signal has a repetitive structure and may include a training symbol with which non-Gaussian noise is summed.

The subobtimal frequency offset estimation unit 720 models the non-Gaussian noise, included in the reception signal, into a CISαS probability density function and estimates a frequency offset on the basis of the probability density function. Here, if frequency offsets are uniformly distributed in a specific range, the subobtimal frequency offset estimation unit 720 may estimate a frequency offset on the basis of the mean value of factors of an angular operation on the frequency offset.

Here, the specific range may be in the range of (−1,1] normalized at sub-carrier intervals, and the subobtimal frequency offset estimation unit 720 may estimate the frequency offset on the basis of Equation below.

$$\hat{\varepsilon}_s =$$

$$\frac{1}{\pi}\angle\left(\sum_{k=0}^{\frac{N}{2}-1} \frac{r^*(k)r(k+N/2)}{\sqrt{\{4\gamma^2 + (|r(k)|+|r(k+N/2)|)^2\}\{4\gamma^2 + (|r(k)|-|r(k+N/2)|)^2\}}}\right)$$

wherein N indicates the number of samples of the reception signal, r(k) indicates a k$^{th}$ sample of the reception signal, * indicates a conjugate complex operation, γ indicates the degree of spreading of noise, ∠ indicates the angular operation, and $\hat{\epsilon}_s$ indicates an estimated frequency offset.

A detailed operation of the frequency offset estimation apparatus 700 according to another embodiment of the present invention is the same as the above-described frequency offset estimation method.

In accordance with the frequency offset estimation apparatus and method of the OFDM system according to the embodiments of the present invention, non-Gaussian noise is modeled into complex isotropic Cauchy noise, and an MLE is used. Accordingly, a frequency offset may be estimated without deteriorated estimated performance even in an irregular impulse noise environment. Accordingly, frequency offset estimation performance can be improved in a non-Gaussian noise environment, as compared with a conventional method in which noise is assumed to be a normal distribution.

Furthermore, since frequency offsets are assumed to be uniformly distributed in a specific range, complexity can be reduced, and a simpler frequency offset robust against non-Gaussian noise can be estimated.

While the invention has been shown and described with respect to the preferred embodiments, it will be understood by those skilled in the art that various changes and modifications may be made without departing from the spirit and scope of the invention as defined in the following claims.

What is claimed is:

1. A frequency offset estimation method of an Orthogonal Frequency Division Multiplexing (OFDM) system performed by a communication signal receiver, comprising:
    receiving a reception signal;
    setting a specific initial frequency offset corresponding to the reception signal; and
    calculating a log-likelihood function based on a Complex Isotropic Symmetric α Stable (CISαS) probability density function obtained by modeling non-Gaussian noise included in the reception signal and estimating an optimum frequency offset based on the log-likelihood function and the initial frequency offset through a Maximum Likelihood Estimator (MLE), wherein the log-likelihood function is represented by Equation below;

$$\Lambda(\tilde{\epsilon}) = \sum_{k=0}^{N/2-1} \log\{|r(k+N/2) - r(k)e^{j\pi\tilde{\epsilon}}|^2 + 4\gamma^2\}$$

wherein N indicates a number of samples of the reception signal, r(k) indicates a k$^{th}$ sample of the reception signal, γ indicates a degree of spreading of noise, and $\tilde{\epsilon}$ indicates a candidate value of the frequency offset.

2. The frequency offset estimation method as claimed in claim 1, wherein the reception signal has a repetitive structure and includes a training symbol with which the non-Gaussian noise is summed.

3. The frequency offset estimation method as claimed in claim 1, wherein estimating the optimum frequency offset is repeated by a preset number of times.

4. The frequency offset estimation method as claimed in claim 1, wherein estimating the optimum frequency offset includes estimating $\hat{\epsilon}$, satisfying Equation below $$\left.\frac{d\Lambda(\tilde{\epsilon})}{d\tilde{\epsilon}}\right|_{\tilde{\epsilon}=\hat{\epsilon}} = 0$$

wherein $\tilde{\epsilon}$ indicates a candidate value of the frequency offset, and $\hat{\epsilon}$ indicates the optimum frequency offset.

5. The frequency offset estimation method as claimed in claim 2, wherein a non-Gaussian noise component included in the reception signal complies with a complex isotropic Cauchy distribution having a dispersion of 2γ.

6. The frequency offset estimation method as claimed in claim 1, wherein estimating the optimum frequency offset includes estimating the optimum frequency offset based on Equation below;

$$\hat{\epsilon} = \frac{1}{\pi}\angle\left(\sum_{k=0}^{N/2-1} \frac{r^*(k)r(k+N/2)}{4\gamma^2 + |r(k)|^2 + |r(k+N/2)|^2 - 2|r(k)r(k+N/2)|\cos(\pi\hat{\epsilon} + \theta_k)}\right)$$

wherein N indicates a number of samples of the reception signal, r(k) indicates a k$^{th}$ sample of the reception signal, * indicates a conjugate complex operation, indicates a degree of spreading of noise, $\hat{\epsilon}$ on a right side indicates the initial frequency offset or an optimum frequency offset in a previous step, ∠ indicates an angular operation, $\theta_k$ indicates ∠(r(k)r*(k+N/2)), and $\hat{\epsilon}$ on a left side indicates an optimum frequency offset.

7. A frequency offset estimation method of an Orthogonal Frequency Division Multiplexing (OFDM) system performed by a communication signal receiver, comprising:
    receiving a reception signal; and
    estimating a frequency offset based on a probability density function obtained by modeling non-Gaussian noise included in the reception signal using a Complex Isotropic Symmetric α Stable (CISαS) probability density function, wherein estimating the frequency offset includes estimating the frequency offset based on Equation below;

$$\hat{\epsilon}_s = \frac{1}{\pi}\angle\left(\sum_{k=0}^{\frac{N}{2}-1} \frac{r^*(k)r(k+N/2)}{\sqrt{\{4\gamma^2 + (|r(k)| + |r(k+N/2)|)^2\}\{4\gamma^2 + (|r(k)| - |r(k+N/2)|)^2\}}}\right)$$

wherein N indicates a number of samples of the reception signal, r(k) indicates a k$^{th}$ sample of the reception signal, * indicates a conjugate complex operation, γ indicates a degree of spreading of noise, ∠ indicates the angular operation, and $\hat{\epsilon}_s$ indicates an estimated frequency offset.

8. The frequency offset estimation method as claimed in claim 7, wherein estimating the frequency offset includes estimating the frequency offset based on a mean value of factors of an angular operation on an optimum offset when the frequency offsets are uniformly distributed in a specific range.

9. The frequency offset estimation method as claimed in claim 8, wherein the specific range is in a range of (−1,1] when normalization is performed at sub-carrier intervals.

10. A frequency offset estimation apparatus of an Orthogonal Frequency Division Multiplexing (OFDM) system comprising:

an input unit for receiving a reception signal; and
an estimation unit for estimating a frequency offset based on a probability density function obtained by modeling non-Gaussian noise included in the reception signal using a Complex Isotropic Symmetric α Stable (CISαS) probability density function,
wherein the estimation unit estimates the frequency offset based on Equation below;

$$\hat{\varepsilon}_s = \frac{1}{\pi} \angle \left( \sum_{k=0}^{\frac{N}{2}-1} \frac{r^*(k)r(k+N/2)}{\sqrt{\{4\gamma^2 + (|r(k)| + |r(k+N/2)|)^2\}\{4\gamma^2 + (|r(k)| - |r(k+N/2)|)^2\}}} \right)$$

wherein N indicates a number of samples of the reception signal, r(k) indicates a $k^{th}$ sample of the reception signal, * indicates a conjugate complex operation, γ indicates a degree of spreading of noise, ∠ indicates the angular operation, and $\hat{\varepsilon}_s$ indicates an estimated frequency offset.

11. The frequency offset estimation apparatus as claimed in claim 10, wherein the estimation unit estimates the frequency offset based on a mean value of factors of an angular operation on an optimum offset when the frequency offsets are uniformly distributed in a specific range.

12. The frequency offset estimation apparatus as claimed in claim 11, wherein the specific range is in a range of (−1,1] when normalization is performed at sub-carrier intervals.

* * * * *